United States Patent [19]
Arin et al.

[11] Patent Number: 5,162,959
[45] Date of Patent: Nov. 10, 1992

[54] ACTUATOR LOCK

[75] Inventors: Haldun Arin, Moorpark; Rick Freeman, Camarillo, both of Calif.

[73] Assignee: Micropolis Corporation, Chatsworth, Calif.

[21] Appl. No.: 705,751

[22] Filed: May 28, 1991

[51] Int. Cl.⁵ ........................ G11B 5/54; G11B 21/22
[52] U.S. Cl. ........................................ 360/105
[58] Field of Search ................................ 360/105

[56] References Cited

U.S. PATENT DOCUMENTS

| | | | |
|---|---|---|---|
| 4,807,072 | 2/1989 | Ono | 360/105 |
| 4,903,157 | 2/1990 | Malek | 360/105 |
| 4,989,108 | 1/1991 | Chang | 360/105 |
| 5,012,371 | 4/1991 | Pollard et al. | 360/105 |
| 5,019,932 | 5/1991 | Iwata | 360/105 |

*Primary Examiner*—Robert S. Tupper
*Attorney, Agent, or Firm*—Poms, Smith, Lande & Rose

[57] ABSTRACT

An actuator lock to hold the disk drive positioner in the parked position after shut down includes a latch arm extending from a selected portion of the positioner, a solenoid, a locking lever and a latch. The solenoid has a coil and an armature. The armature is moveable between a normally biased first armature position and a second armature position. The solenoid coil when energized by a current pulse upon shut down of the disk drive moves the armature into the second position. The locking lever is rotatably mounted to the armature and has a first end. The locking lever is movable between a normally biased first lever position and second lever position. The first end engages the latch arm when the positioner has been brought to the parked position by the current pulse and the armature coil has also been energized. When the armature is in the first armature position, the locking lever is non-interactive with the latch arm. After the armature has been brought to its second position the first end of the locking lever engages the latch arm thereby locking the device. The latch is a mechanical hold feature which will maintain the armature in its second position to maintain the positioner in a locked state. To unlock the actuator latch, upon power up of the disk drive, the actuator will begin to move the positioner. A force of the latch arm against the locking lever will move the locking lever into its second lever position which releases the mechanical latch. When the mechanical latch is released, the locking lever and the armature each return to their first normally biased position.

33 Claims, 3 Drawing Sheets

ACTUATOR LOCK

FIELD OF THE INVENTION

The present invention relates generally to disk drives, and more particularly to a no hold power, assured disengage actuator lock for use therein.

BACKGROUND OF THE INVENTION

In a Winchester type disk drive, a positioner carries a read/write head above the magnetic material coated surface of a disk. The positioner is rotated by an actuator mounted to the chassis of the disk drive. The actuator locates the positioner in response to an address signal so that the heads become properly located along an addressed track within the data zone of the disk.

When the disk drive is shut down, it is desirable to move the positioner to a position which causes the heads to be removed from the data zone to a landing zone. This removal of the heads to the landing zone is widely known in the art as "parking" the heads. Once the heads are parked, it is desirable to latch the positioner in its parked position. With the positioner latched in the parked position, the positioner is unable to stray back into the data zone in the event of unintentional shock and vibration acting upon the disk drive. Such unintentional shock and vibration may come from the casual moving of the disk drive or equipment containing the disk drive.

To latch the positioner in the parked position, a solenoid activated lock may be provided for engaging either of the positioner or actuator. For example, in U.S. Pat. No. 4,807,072 (hereinafter "the '072 patent"), a head positioner control mechanism with head locking for a magnetic disk drive is disclosed. The transducer head is locked by a locking lever which pivots in a plane parallel to the disk plane for movement in and out of locking engagement with a latching member jointly rotatable with the head arm positioner. A solenoid holds the locking lever out of engagement with the latching member during data transfer between the disk and head. Upon completion of data transfer or when power is removed from the disk drive, the solenoid becomes de-energized thereby permitting the locking lever to be sprung into locking engagement with the latching member. Since the latching member is jointly rotatable with the head positioner, the positioner is locked in place.

A disadvantage and limitation of the device disclosed in the '072 patent is that during operation of the disk drive, an electrical current needs to be continuously applied to the locking solenoid to keep the locking lever retracted. A loss of this current during normal disk drive operation can cause unwanted interaction of the locking lever with the latch arm which may result in catastrophic failure of the disk drive. This current also generates heat in the solenoid windings which may, over a period of time, cause failure of the solenoid. Furthermore, the holding current during operation of the solenoid increases power usage of the disk drive.

The disadvantages and limitations of the device described in the '072 patent are specifically addressed by the electromechanical latch described in U.S. Pat. No. 4,989,108 (hereinafter "the '108 patent"). The latch described in the '108 patent is of the type where the latching member is removed from its latching position upon a current being applied to the electromechanical latch and wherein the latch remains removed from the latching position when the current is removed.

More particularly, the electromechanical latch described in the '108 patent includes a solenoid having an armature moveable from a normally biased first position to a second position in response to an electrical current being applied to the solenoid, and means for holding the armature in the second position to allow subsequent removal of the current from the solenoid. When the armature is in its first position, it is adapted for latching a positioner in a parked position. The armature is not interactive with the positioner when its in its second position. The electromechanical latch further includes means for releasing the holding of the armature in response to the positioner returning to its parked position, whereby the armature returns to its normally biased first position to latch the positioner.

Thus, the device of the '108 patent advanced the state of the art from that disclosed on the '072 patent in that the current need be applied to the solenoid only for moving the armature to its second position to release the positioner. Once in the second position, the armature is held mechanically. This advance in the state of the art then allowed the current to be removed from the solenoid with the holding means holding the armature in a position which is non-interactive with the positioner during normal operation of the disk drive.

In some prior art devices in which a current releases the lock and a mechanical hold feature allows removal of the current, the positioner may need to have slight over travel to trigger a hook mechanism which captures the positioner in its parked position. This over travel may cause some of the data zone to be wasted for use in conjunction with the over travel. Should the positioner fail to over travel, the hook mechanism will not engage the latch arm and the positioner will not be locked. Furthermore, to disengage the positioner, a disengage current sufficient to overcome the magnetic attraction between the core and the armature at a specified range of voltages would be required. It is possible that a latch may be "sticky" and not respond to the disengage current.

SUMMARY OF THE INVENTION

It is therefore an object of the present invention to overcome one or more disadvantages and limitations of the prior art hereinabove enumerated.

It is an object of the present invention to provide an actuator lock which does not require a disengage current to release the positioner.

It is another object of the present invention to provide an actuator lock which does not require over travel of the positioner to engage a hook mechanism so that it may be locked in the parked position.

These objects of the present invention are met by a novel actuator lock which has the features of providing for positive engagement of the actuator or positioner in response to an electrical signal, allowing for the subsequent removal of this signal by a mechanical hold feature in the locked stated, and providing assured disengage of the actuator lock from the positioner or actuator.

According to the present invention, an actuator lock to hold the disk drive positioner in the parked position after shut down includes a latch arm extending from a selected portion of the positioner, a solenoid, a locking lever and a latch. The solenoid has a coil and an armature. The armature is moveable between a normally biased first armature position and a second armature position. The solenoid coil when energized by a current pulse upon shut down of the disk drive moves the armature into the second position. The locking lever is rotatably mounted to the armature and has a first end. The locking lever is movable between a normally biased first lever position and second lever position. The first end engages the latch arm when the positioner has been brought to the parked position by the current pulse and the armature coil has also been energized. When the armature is in the first armature position, the locking lever is non-interactive with the latch arm. After the armature has been brought to its second position, and the positions has been brought to the parked position, the first end of the locking lever engages the latch arm thereby locking the device. The latch is a mechanical hold feature which will maintain the armature in its second position to maintain the positioner in a locked state. To unlock the actuator latch, upon power up of the disk drive, the actuator will begin to move the positioner. A force of the latch arm against the locking lever will move the locking lever into its second lever position which releases the mechanical latch. When the mechanical latch is released, the locking lever and the armature each return to their first normally biased position.

An advantage of the present invention is that the park signal developed internally within the disk drive may be utilized to provide the electrical signal required for activating the actuator lock and latching the positioner in the parked position. The presence of the park signal ensures that both the positioner will be in the parked position and the actuator lock will be activated for positively engaging the positioner or actuator. Another advantage of the present invention is that the disengaging of the actuator lock is assured during power up of the disk drive by the actuator exerting sufficient force against the mechanical hold feature of the actuator lock to release the lock and return it to a non-interactive unlocked state. This mechanical hold feature assured disengage by providing a release direction in the mechanical hold mechanism which is orthogonal to the engage direction. Thus, the disengage force can be specified differently from the required engage force.

These and other objects, advantages and features of the present invention will become readily apparent to those skilled in the art from a study of the following Description of an Exemplary Preferred Embodiment when read in conjunction with the attached Drawings and appended claims.

DESCRIPTION OF AN EXEMPLARY PREFERRED EMBODIMENT

Figure 1:
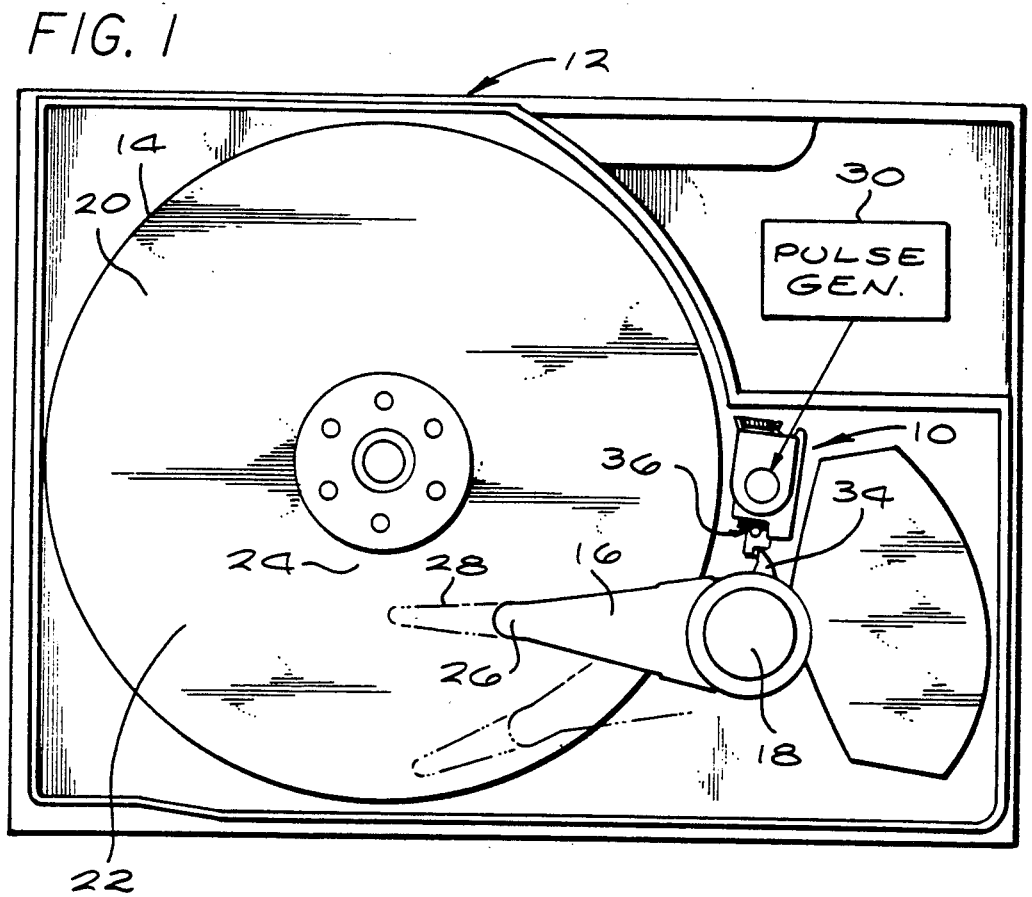
FIG. 1 is a plan view of a disk drive incorporating the actuator lock of the present invention.
Figure 2:
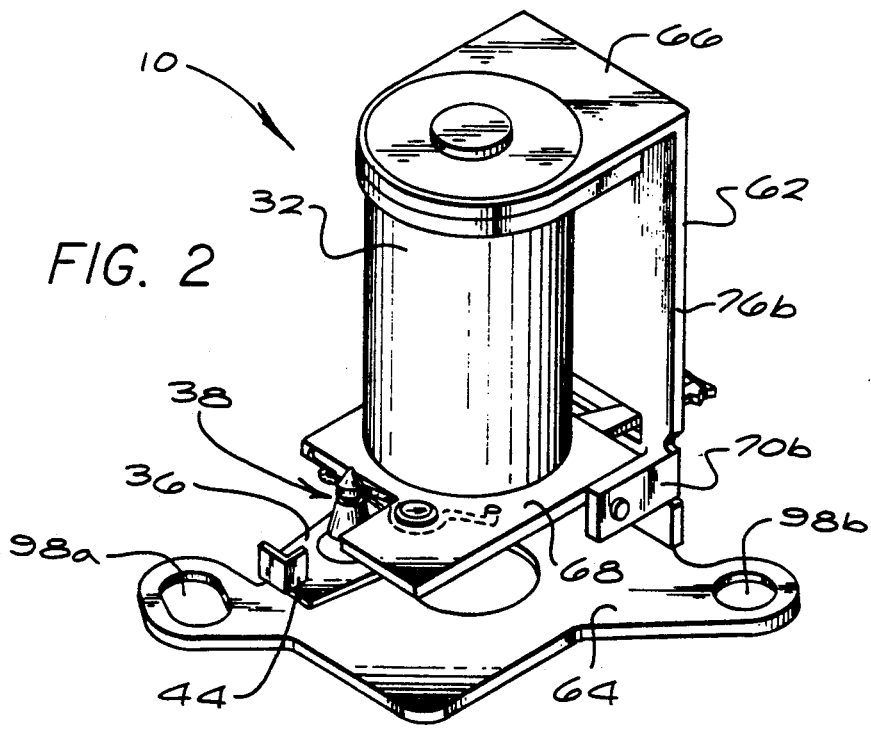
FIG. 2 is a perspective view of the actuator lock constructed according to the principles of the present invention.

Referring now to FIG. 1 and FIG. 2, there is shown an actuator lock 10, which is constructed according to the principles of the present invention and is described in sufficient detail hereinbelow, and a disk drive 12. The disk drive 12 provides an environment in which the actuator lock 10 finds particular utility. This utility will become readily apparent from the following description of the actuator lock 10 in the environment of the disk drive 12. This environment will be described immediately hereinbelow and followed by a description of the actuator lock 10 which, with sufficient detail, will enable those skilled in the art to make and use the present invention.

The disk drive 12 includes a rotatable data storing disk 14, an arm or positioner 16, and an actuator 18. As is well known in the art, the disk 14 has at least one surface 20 which contains a magnetic medium. The magnetic medium is divided into a data zone 22 and a landing zone 24. The data zone 22 includes, as is well known in the art, the sectors and tracks in which the addressable data is stored.

The positioner 16 is mounted adjacent the disk 12. The positioner 16 has a first end portion 26 at which a read/write head 28 (shown in phantom) is disposed. The positioner 16 locates the read/write head 28 over an addressed track within the data zone 22 during normal disk operation. Upon shut down of the disk drive, the positioner 16 locates the read/write head 28 over the landing zone 24.

In FIG. 1, the positioner 16 is shown in its parked position with the read/write head 28 over the landing zone 24. As is well known, the purpose of the landing zone 24 is to provide a resting place for the read/write head 28 after the disk has been shut down. Because the read/write head 28 would cause damage to the magnetic surface 20 of the disk 14 due to unintentional shock and vibration should the head 28 come into contact with the surface 20 within the data zone 22, allowing the head 28 to come to rest within the landing zone 24 insures that data, within the data zone 22, is not lost.

The actuator 18, as is well known in the art, locates the positioner 16 in response to address signals such that the read/write head 28 is over the data zone 22 so that data may be read to and written from the addressed sectors and tracks within the data zone 22. Upon shut down of the disk drive, the actuator 18 receives an electrical signal which is referred to hereinafter as a "park" signal. In response to the park signal, the actuator 18 locates the positioner 16 such that the read/write heads 28 are over the landing zone 24.

To develop the park signal signal, the disk drive 12 may further include a pulse generating circuit 30. The pulse generating circuit may be of the type shown and disclosed in commonly owned U.S. Pat. No. 4,939,600 (hereinafter "the '600 patent"). A full description of the pulse generating circuit 30 may be obtained from a study of the '600 patent. Generally, upon shut down of the disk drive 12, the back EMF from the spindle drive motor (not shown), which is used to drive the disk 14, is detected by a controller which generates the park signal for application to the actuator 18.

As will be described in greater detail hereinbelow, once the positioner 16 has located the read/write head 28 over the landing zone 24, the actuator latch 10 will then, also in response to the park signal, positively engage the actuator 18 so that the positioner is prevented from further movement so that the read/write head 28 does not stray into the data zone 22. The various features of the actuator lock 10, which have been discussed hereinabove, will become apparent from the following description.

Figure 3:
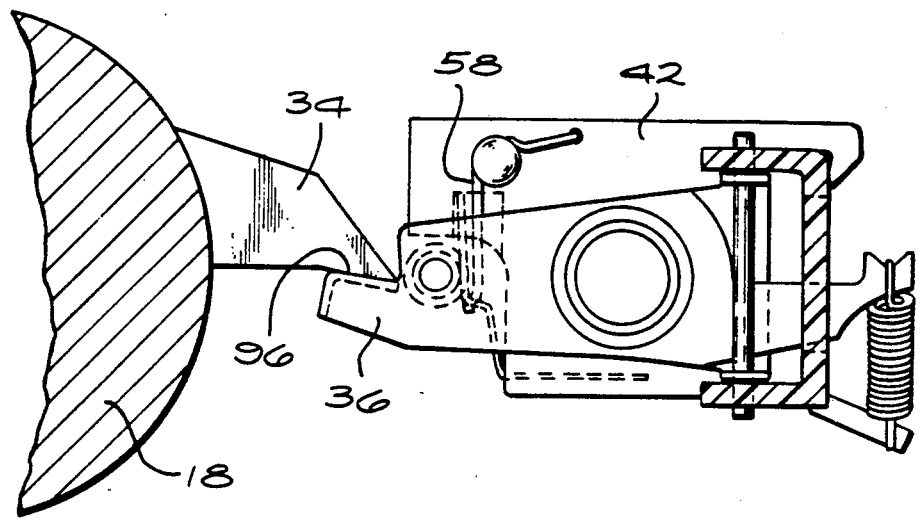
FIG. 3 is a plan view, partially in cross-section, of the actuator lock of FIG. 2.

With further references to FIGS. 3-7, a exemplary embodiment of the actuator lock 10 is described in detail. The actuator lock 10 includes a solenoid 32, a latch arm 34, a locking lever 36 and a latch 38. As is best seen in FIGS. 1 and 3, the latch arm 34 extends from a selected portion of the actuator 18.

Figure 4:
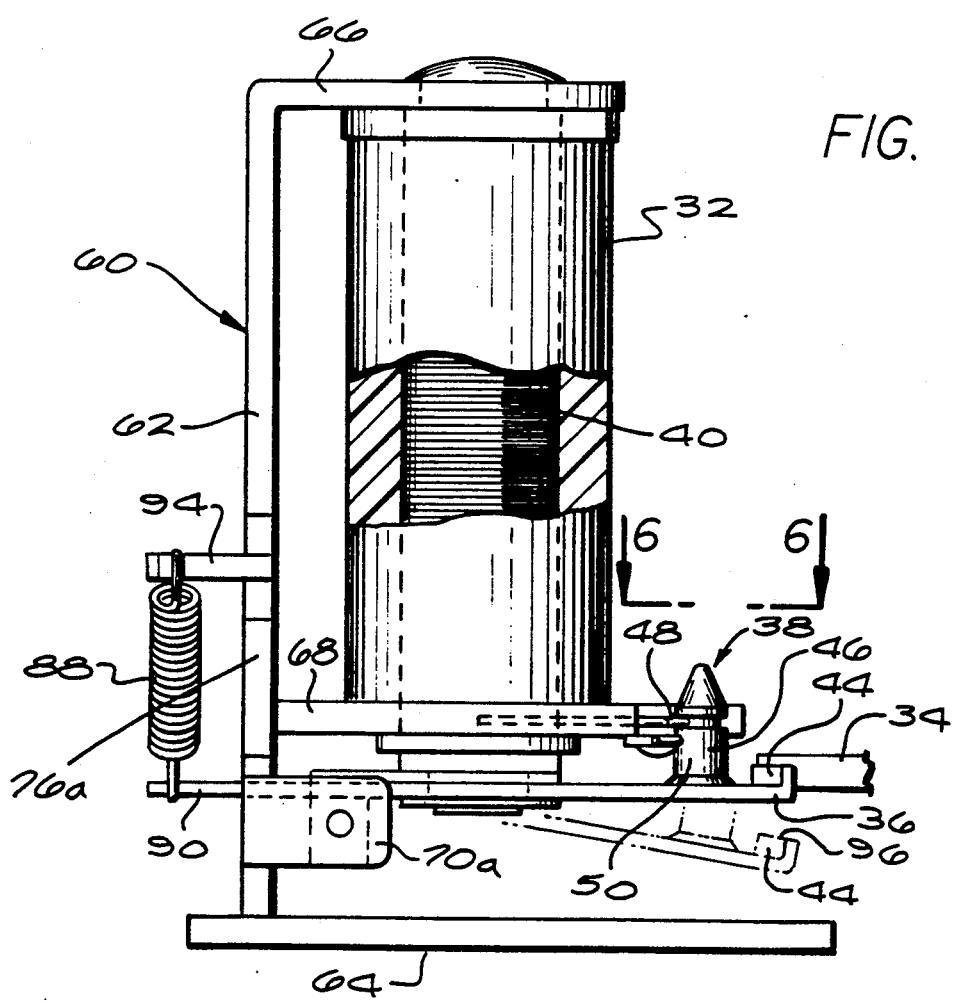
FIG. 4 is a side elevational view, partially broken and partially in cross section, of the actuator lock of FIG. 2.
Figure 5:
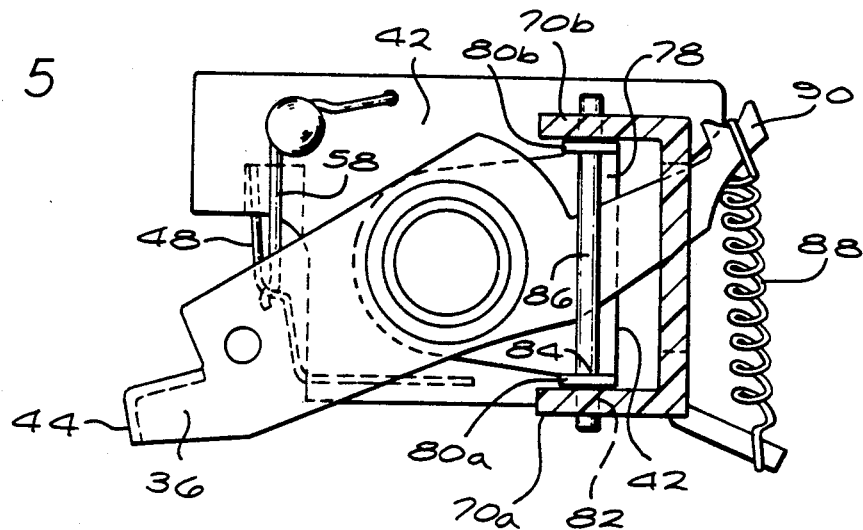
FIG. 5 is a bottom plane view, partially in cross-section of the actuator lock of FIG. 2.
Figure 6:
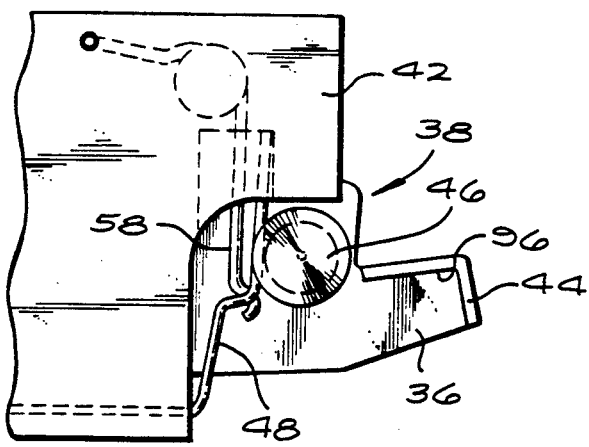
FIG. 6 is a fragmentary view showing a detail of the actuator lock of FIG. 2.

The solenoid 32 includes a solenoid coil 40, best seen in FIG. 4, and an armature 42, best seen in FIGS. 3 and 5-6. The armature 42 is movable between an normally biased first armature position, shown in phantom in FIG. 4, and a second armature position, which is shown in FIG. 4 with the armature 42 pulled up toward the solenoid coil 40. When the armature 42 is in the first armature position, the locking lever 36 is non-interactive with the latch arm 34. The solenoid coil 40 when energized develops a magnetic field which draws the armature 42 into its second armature position.

The park signal developed by the pulse generating circuit 30 may be used further to develop a current pulse of appropriate amplitude which is applied to the coil 40 upon shut down of the disk drive 12 to bring the armature 42 into its second position. When the armature 42 is in its second position, it brings the locking lever 36 into position to engage the latch arm 34 to maintain the positioner 16 in its locked position. Furthermore, the latch 38 will hold the locking lever 36 in engagement with the latch arm 34 and hence the armature 42 in the second armature position, subsequent to the current being removed from the coil 40.

The locking lever 36 is rotatably mounted to the armature 42 and has a first end 44. The locking lever 36 is rotatable between a normally biased first lever position as seen in FIGS. 2-4 and 6 and a second lever position as seen in FIG. 5. The first end 44 of the locking lever 36 engages the latch arm 34 when the positioner 16 has been brought to its parked position by the actuator 18 and the armature coil 40 has been energized by the current pulse which moves the armature 42 to its second armature position, with this position being shown in FIGS. 3-4. At all times except for releasing of locking lever 36 from the latch arm 34, the locking lever 36 and the first end 44 thereof are in the first lever position. The latch 38 has a first member 46 and a second member 48. The second member 48 is releasably attachable to the first member 46. The first member 46 is carried by the locking lever 36. The second member 48 is disposed such that the first member 46 releasably attaches to the second member 48 when the armature 42 is moved to the second armature position with the locking lever 36 in the first lever position. When the first member 46 engages the second member 48, the solenoid coil 40 can be de-energized subsequent to the shut down of the disk drive.

The first member 46 is released from the second member 48 when the latch arm 34 momentarily pushes the first end 44 of the locking lever 36 to the second lever position shown in FIG. 5. The latch arm 34 causes such release in response to the positioner 16 being removed from the parked position by the actuator 18 upon power up of the disk drive. The armature 42 and the looking lever 36 each respectively return to their normally biased first armature position and first lever position upon the first member 46 being released from the second member 48. Upon such release, the first end 44 drops away from the latch arm 34 as best seen in phantom in FIG. 4.

In construction of the latch 38, the first member 46 is a bobbin 50 disposed at the first end 44 of the locking lever 36. The second member 48 of the latch 38 is a spring clip 52. The bobbin 50 extends orthogonal to the rotation of the locking lever 36. Moreover, the bobbin 50 has a conical tip 54 and an annular channel 56 coaxially disposed with the tip 54.

The spring clip 52 engages the channel 56 when the armature 42 is moved into the second armature position. The spring clip 52 furthermore has a length sufficient such that the spring clip 52 is released from the channel when the first end 44 of the locking lever 36 is moved into the second lever position. It is to be noted that that direction of movement of the bobbin 50 with respect to the spring clip 52 for mechanical engagement of the latch 38 is orthogonal to that movement required for disengagement. When the bobbin 50 is being slid across the spring clip 52 during disengagement and as soon as the spring clip 52 clears the channel 56, the armature 42 and locking lever 36 drop away into the normally biased first position shown in phantom in FIG. 4. It is seen from FIGS. 3 and 5 when the locking lever 36 engages the latch arm 34 (FIG. 3), the latch arm 34 will urge the locking lever 36 into its second position releasing the bobbin 50 from the spring clip 52.

So that the latch arm 34 does not cause release of the latch 38 during unintentional shock and vibration, the force required to disengage the mechanical latch 38 is determined by a radial force acting upon the channel 56 by the spring clip 52. To establish this force, the spring clip 52 is urged by a second spring clip 58 into engagement with the channel 56. As best seen in FIGS. 5 and 6, the first spring clip 52 is engaged at a twist in its mid-section by the distal end of the second spring clip 58. Both spring clips mounted in a fixed relationship to the movement of the bobbin 50.

To provide mounting of each of the elements of the actuator lock 10, a mounting bracket 60 is provided. The mounting bracket 60 includes all elements except for the latch arm 34 which is attached to the positioner 16 as described hereinabove.

The mounting bracket 60 includes an upright wall 62, a lower platform 64, an upper platform 66, a middle platform 68 and a pair of flanges 70a and 70b. The upright wall 62 has a lower edge 72, an upper edge 74 and a pair of side edges 76a and 76b. The lower platform 64 extends from the lower edge 72. The upper platform 66 extends from the upper edge 74. The middle platform 68 extends from the upright wall 62 in a spaced relationship below the lower platform 64. The flange 70a extends from the side edge 76a. Similarly, the flange 70b extends from the side edge 76b. Each of the flanges 70a and 70b are disposed immediately below the middle platform 68. The solenoid 32, and more particularly, the part of the solenoid 42 which holds the coil 40 is mounted to each of the upper platform 66 and the lower platform 64.

The armature 42 is a generally flat plate having a hinged rear edge 78. The rear edge 78 is hinged to the flanges 70a, 70b. More particularly, as best seen in FIGS. 4-5, the rear edge 78 of the armature 42 has a pair of mounting tangs 80a, 80b. Mounting tang 80a is in a facing relationship to flange 70a. Similarly, mounting tang 80b is in a facing relationship to flange 70b. The flanges 70a, 70b and the tangs 80a, 80b contain coaxially aligned openings 82, 84 therein. The pin 86 is received through each of the openings, 82, 84. The pin 86 is press fit into the openings 82 and 82b of each respective one of the flanges 70a, 70b. The openings 84a, 84b within the tangs 80a, 80b receive the pin in rotatable engagement.

To bias each of the armature 42 and locking lever 36 into their first position, a spring 88 is provided. The locking lever 36 has a second end 90 extending through a slot 92 in the upright wall 62 of the mounting bracket 60. The slot 92 is disposed generally between the flanges 70a, 70b. The side edge 76a of the mounting bracket 66 has a further mounting flange 94. The spring 88 is operably mounted between the mounting flange 94 and the second end 90 of the locking lever 36.

Figure 7:
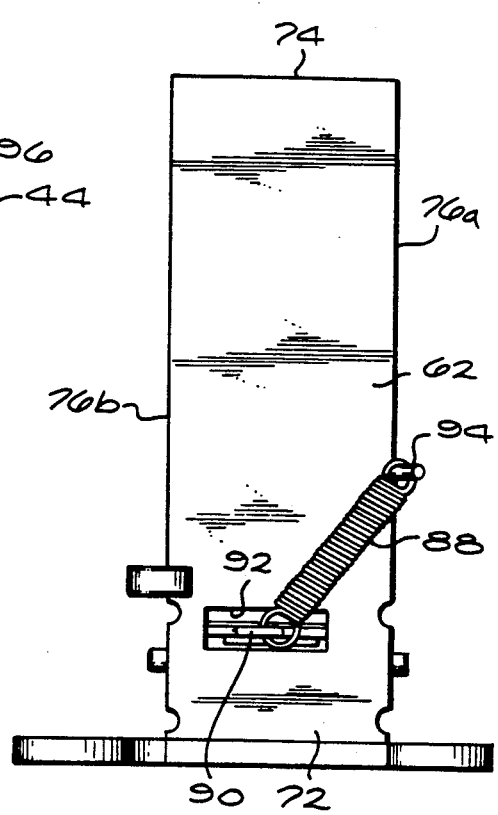
FIG. 7 is a rear elevational view of the actuator lock of FIG. 2.

As best seen in FIG. 7, the spring 88 is mounted at an angle to the vertical movement of the armature 42 and the horizontal movement of the locking lever 36. In this way, the spring 88 provides biasing for both. For example, the horizontal component of spring force will bias the locking lever 36 in its first position. The vertical component of the spring force is transferred through the locking lever 36 to the armature 42 to maintain the armature 42 in its first position, as shown in phantom in FIG. 4.

The first end 44 of the locking lever 36, to more positively engage the latch arm 34, is notched. This notched end 44 has an upright portion 96 which provides for a surface with the latch arm 36 engages.

The lower platform 64 of the mounting bracket 66 is adapted for mounting to the chassis of the disk drive 12. To provide for alignment of the surface 96 with the latch arm 34, the mounting hole 98a is elongated to provide adjustment. The mounting hole 98b is circular to receive a bolt.

There has been described hereinabove a novel actuator lock for a disk drive. It is apparent that those skilled in the art may now make numerous uses from the above described Exemplary Preferred Embodiment without departing from the inventive concepts disclosed herein. Accordingly, the present invention is to be defined solely by the scope of the following claims.

I claim:

1. For a device having an element positionable by an actuator, an actuator lock comprising:
a solenoid including a solenoid coil and an armature wherein said armature is movable between a normally biased first armature position and a second armature position, said solenoid coil when energized developing a magnetic field for moving said armature into said second position;
a latch arm extending from a selected portion of said element;
a locking lever being rotatably mounted to said armature and having a first end movable between a normally biased first lever position and a second lever position, said first end engaging said latch arm when said element has been brought to a parked position by said actuator and said armature coil has been energized to move said armature to said second armature position while said first end is in said first lever position; and
a latch having a first member and a second member releasably attachable to said first member, said first member being carried by said locking lever, said second member being disposed such that said first member releasably attaches to said second member when said armature is moved to said second armature position when said lever in said first position thereof so that said solenoid coil can be de-energized, said first member being released from said second member when said latch arm moves said first end of said lever to said second lever position in response to said element is removed from said parked position by said actuator, said armature and said lever each respectively returning to said normally biased first armature position and first lever position when said first member is released from said second member.

2. An actuator lock as set forth in claim 1 wherein said solenoid is de-energized subsequent to said first member engaging said second member.

3. An actuator lock as set forth in claim 1 wherein said armature is spring biased in said first armature position.

4. An actuator lock as set forth in claim 3 wherein said armature is a generally flat plate having a hinged edge.

5. An actuator lock as set forth in claim 4 wherein said lever is rotatable in the plane of said armature.

6. An actuator lock as set forth in claim 1 wherein said lever has a second end, said second end being spring biased to maintain said first end in said first lever position.

7. An actuator lock as set forth in claim 1 wherein said first member is a bobbin disposed at said first end of said lever, said bobbin extending normal to the rotation of said lever, said bobbin having a conical tip and an annular channel coaxially disposed with said tip, and further wherein said second member is a spring clip which engages said channel when said armature is moved to said second position, said spring clip having a length such that spring clip is released from said channel when said first end is moved to said second lever position.

8. An actuator lock as set forth in claim 1 further comprising:
a mounting bracket including an upright wall having a lower edge, an upper edge and a pair of side edges, a lower platform extending from said lower edge, an upper platform extending from said upper edge, a middle platform extending from said upright wall above said lower platform wherein each platform is in a spaced apart relationship to each other, and a pair of flanges, each of said flanges extending from a respective one of said side edges adjacent and below said middle platform;
said coil being mounted to each of said upper platform and said lower platform, said armature having a rear end hinged to said pair of flanges.

9. An actuator lock as set forth in claim 8 wherein said lower platform is adapted to mount to a chassis of said device.

10. An actuator lock as set forth in claim 8 wherein said upright wall has a slot disposed between pair of flanges, said lever having a second end extending through said slot, said second end being spring biased to hold said first end in said first lever position.

11. An actuator lock as set forth in claim 10 wherein said apparatus further comprises a spring, one of said side edges having a mounting flange, said spring being mounted operably between said mounting flange and said second end.

12. For a disk drive having an arm shaped positioner, an actuator which rotates selectively said positioner, and a circuit which develops a current pulse upon shut down of said disk drive wherein said current pulse is applied to said actuator to locate said positioner in parked position, an actuator lock to hold said positioner in said parked position after shut down comprising:

a latch arm extending from a selected portion of said positioner;

a solenoid including a coil and armature movable between a normally biased first armature position and second armature position, said solenoid coil when energized moving said armature into said second position;

a locking lever being rotatably mounted to said armature and having a first end movable between a normally biased first lever position and a second lever position, said first end engaging said latch arm when said positioner has been brought to said parked position by said actuator and said armature coil has been energized to move said armature to said second armature position while said first end is in said first lever position; and a latch having a first member and a second member releasably attachable to said first member, said first member being carried by said locking lever, said second member being disposed such that said first member releasably attaches to said second member when said armature is moved to said second armature position when said lever in said first lever position so that said solenoid coil can be de-energized subsequent to shut down of said disk drive, said first member being released from said second member when said latch arm momentarily moves said first end to said second lever position in response to said positioner being removed from said parked position by said actuator, said armature and said lever each respectively returning to said normally biased first armature position and said first lever position when said first member is released.

13. An actuator lock as set forth in claim 12 wherein said solenoid is de-energized subsequent to said first member engaging said second member.

14. An actuator lock as set forth in claim 12 wherein said armature is spring biased in said first armature position.

15. An actuator lock as set forth in claim 14 wherein said armature is a generally flat plate having a hinged edge.

16. An actuator lock as set forth in claim 15 wherein said lever is rotatable in the plane of said armature.

17. An actuator lock as set forth in claim 12 wherein said lever has a second end, said second end being spring biased to maintain said first end in said first lever position.

18. An actuator lock as set forth in claim 12 wherein said first member is a bobbin disposed at said first end of said lever, said bobbin extending normal to the rotation of said lever, said bobbin having a conical tip and an annular channel coaxially disposed with said tip, and further wherein said second member is a spring clip which engages said channel when said armature is moved to said second position, said spring clip having a length such that spring clip is released from said channel when said first end is moved to said second lever position.

19. An actuator lock as set forth in claim 12 further comprising:

a mounting bracket including an upright wall having a lower edge, an upper edge and a pair of side edges, a lower platform extending from said lower edge, an upper platform extending from said upper edge, a middle platform extending from said upright wall above said lower platform wherein each platform is in a spaced apart relationship to each other, and a pair of flanges, each of said flanges extending from a respective one of said side edges adjacent and below said middle platform;

said coil being mounted to each of said upper platform and said lower platform, said armature having a rear end hinged to said pair of flanges.

20. An actuator lock as set forth in claim 19 wherein said lower platform is adapted to mount to a chassis of said device.

21. An actuator lock as set forth in claim 19 wherein said upright wall has a slot disposed between pair of flanges, said lever having a second end extending through said slot, said second end being spring biased to hold said first end in said first lever position.

22. An actuator lock as set forth in claim 21 wherein said apparatus further comprises a spring, one of said side edges having a mounting flange, said spring being mounted operably between said mounting flange and said second end.

23. A disk drive comprising:

a rotatable disk including at least one surface having a data zone and a landing zone;

an elongated rotatable arm-shaped positioner being mounted adjacent said disk and having a first end portion and a read/write head disposed at said first end portion, said arm positioning said read/write head over one of said data zone and said landing zone;

an actuator which locates said positioner in response to address signals such that said read/write head is over said data zone to read and write data thereto and further position said arm in response to a park signal to position said read/write head over said landing zone;

a pulse generating circuit which develops said park signal upon shutdown of said disk drive;

a latch arm extending from a selected portion of said positioner;

a solenoid including a coil and armature movable between a normally biased first armature position and second armature position, said solenoid coil when energized moving said armature into said second position;

a locking lever being rotatably mounted to said armature and having a first end movable between a normally biased first lever position and a second lever position, said first end engaging said latch arm when said positioner has been brought to said parked position by said actuator and said armature coil has been energized to move said armature to said second armature position while said first end is in said first lever position; and a latch having a first member and a second member releasably attachable to said first member, said first member being carried by said locking lever, said second member being disposed such that said first member releasably attaches to said second member when said armature is moved to said second armature position when said lever in said first lever position so that said solenoid coil can be de-energized subsequent to shut down of said disk drive, said first member being released from said second member when said latch arm momentarily moves said first end to said second lever position in response to said positioner being removed from said parked position by said actuator, said armature and said lever each respectively returning to said normally biased first armature position and said first lever position when said first member is released.

24. An actuator lock as set forth in claim 23 wherein said solenoid is de-energized subsequent to said first member engaging said second member.

25. An actuator lock as set forth in claim 23 wherein said armature is spring biased in said first armature position.

26. An actuator lock as set forth in claim 25 wherein said armature is a generally flat plate having a hinged edge.

27. An actuator lock as set forth in claim 26 wherein said lever is rotatable in the plane of said armature.

28. An actuator lock as set forth in claim 23 wherein said lever has a second end, said second end being spring biased to maintain said first end in said first lever position.

29. An actuator lock as set forth in claim 23 wherein said first member is a bobbin disposed at said first end of said lever, said bobbin extending normal to the rotation of said lever, said bobbin having a conical tip and an annular channel coaxially disposed with said tip, and further wherein said second member is a spring clip which engages said channel when said armature is moved to said second position, said spring clip having a length such that spring clip is released from said channel when said first end is moved to said second lever position.

30. An actuator lock as set forth in claim 23 further comprising:
a mounting bracket including an upright wall having a lower edge, an upper edge and a pair of side edges, a lower platform extending from said lower edge, an upper platform extending from said upper edge, a middle platform extending from said upright wall above said lower platform wherein each platform is in a spaced apart relationship to each other, and a pair of flanges, each of said flanges extending from a respective one of said side edges adjacent and below said middle platform;
said coil being mounted to each of said upper platform and said lower platform, said armature having a rear end hinged to said pair of flanges.

31. An actuator lock as set forth in claim 30 wherein said lower platform is adapted to mount to a chassis of said device.

32. An actuator lock as set forth in claim 30 wherein said upright wall has a slot disposed between pair of flanges, said lever having a second end extending through said slot, said second end being spring biased to hold said first end in said first lever position.

33. An actuator lock as set forth in claim 32 wherein said apparatus further comprises a spring, one of said side edges having a mounting flange, said spring being mounted operably between said mounting flange and said second end.

* * * * *